(12) United States Patent
Yoon

(10) Patent No.: US 9,134,768 B2
(45) Date of Patent: Sep. 15, 2015

(54) PORTABLE TERMINAL WITH OPTICAL TOUCH PAD AND METHOD FOR CONTROLLING DATA IN THE SAME

(75) Inventor: Chiwoong Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 588 days.

(21) Appl. No.: 13/279,872

(22) Filed: Oct. 24, 2011

(65) Prior Publication Data

US 2012/0154304 A1 Jun. 21, 2012

(30) Foreign Application Priority Data

Dec. 16, 2010 (KR) ........................ 10-2010-0128991

(51) Int. Cl.
G06F 1/16 (2006.01)
G06F 3/0354 (2013.01)

(52) U.S. Cl.
CPC .............. *G06F 1/169* (2013.01); *G06F 1/1626* (2013.01); *G06F 1/1643* (2013.01); *G06F 3/03547* (2013.01)

(58) Field of Classification Search
None
See application file for complete search history.

(56) References Cited

U.S. PATENT DOCUMENTS

| | | | | |
|---|---|---|---|---|
| 4,380,359 A * | 4/1983 | Hoffman et al. | ................. | 439/81 |
| 5,543,588 A * | 8/1996 | Bisset et al. | ................. | 178/18.06 |
| 5,729,219 A * | 3/1998 | Armstrong et al. | ............. | 341/20 |
| 5,818,956 A * | 10/1998 | Tuli | ................. | 382/126 |
| 6,043,809 A * | 3/2000 | Holehan | ........................ | 345/168 |
| 6,172,666 B1 * | 1/2001 | Okura | ............................ | 345/168 |
| 6,791,072 B1 * | 9/2004 | Prabhu | ........................ | 250/208.1 |
| RE40,324 E * | 5/2008 | Crawford | ........................ | 345/157 |
| 7,420,155 B2 * | 9/2008 | Mizota et al. | ................. | 250/221 |
| 7,761,814 B2 * | 7/2010 | Rimas-Ribikauskas et al. | ............................. | 715/863 |
| 8,023,262 B2 * | 9/2011 | Ligtenberg et al. | ....... | 361/679.55 |
| 8,149,224 B1 * | 4/2012 | Kuo et al. | ........................ | 345/173 |
| 2002/0086711 A1* | 7/2002 | Flannery | ........................ | 455/566 |
| 2002/0158838 A1* | 10/2002 | Smith et al. | ................... | 345/156 |
| 2003/0043174 A1* | 3/2003 | Hinckley et al. | .............. | 345/684 |
| 2003/0063071 A1* | 4/2003 | Wyatt | ............................. | 345/172 |
| 2003/0184528 A1* | 10/2003 | Kawasaki et al. | ............. | 345/173 |
| 2004/0007660 A1* | 1/2004 | Huang et al. | ................ | 250/214.1 |
| 2004/0263480 A1* | 12/2004 | Pagan | ........................... | 345/172 |
| 2005/0012723 A1* | 1/2005 | Pallakoff | ........................ | 345/173 |
| 2005/0035949 A1* | 2/2005 | Beck et al. | ..................... | 345/168 |
| 2005/0052425 A1* | 3/2005 | Zadesky et al. | ................ | 345/173 |
| 2005/0156980 A1* | 7/2005 | Walker | ........................... | 347/19 |
| 2006/0031465 A1* | 2/2006 | Ahya et al. | ..................... | 709/224 |
| 2006/0038791 A1* | 2/2006 | Mackey | ........................ | 345/173 |
| 2006/0055662 A1* | 3/2006 | Rimas-Ribikauskas et al. | ............................. | 345/156 |
| 2006/0152484 A1* | 7/2006 | Rolus Borgward | ........... | 345/157 |
| 2006/0197750 A1* | 9/2006 | Kerr et al. | ..................... | 345/173 |
| 2006/0250377 A1* | 11/2006 | Zadesky et al. | ................ | 345/173 |
| 2006/0258337 A1* | 11/2006 | Fujita et al. | ................ | 455/414.1 |
| 2006/0290661 A1* | 12/2006 | Innanen et al. | ................ | 345/156 |

(Continued)

FOREIGN PATENT DOCUMENTS

WO WO2009/031213 * 3/2009 ............. G06F 3/048

*Primary Examiner* — Antonio Xavier
(74) *Attorney, Agent, or Firm* — Cha & Reiter, LLC.

(57) ABSTRACT

Disclosed is a portable terminal having a display device arranged on the front side of the housing of the portable terminal, and an optical touch pad arranged on the rear side of the housing, wherein a user can operate the touch screen with the thumb and operate the touch pad on the rear side of the housing with the index finger or another finger in a state in which the user grasps the portable terminal.

16 Claims, 7 Drawing Sheets

(56) References Cited

U.S. PATENT DOCUMENTS

| | | | |
|---|---|---|---|
| 2007/0063969 A1* | 3/2007 | Wright | 345/156 |
| 2007/0162875 A1* | 7/2007 | Paquette et al. | 715/847 |
| 2007/0206100 A1* | 9/2007 | Hikita | 348/211.7 |
| 2007/0268261 A1* | 11/2007 | Lipson | 345/169 |
| 2008/0018614 A1* | 1/2008 | Rekimoto | 345/173 |
| 2008/0024441 A1* | 1/2008 | Harley et al. | 345/157 |
| 2008/0030460 A1* | 2/2008 | Hildreth et al. | 345/156 |
| 2008/0174570 A1* | 7/2008 | Jobs et al. | 345/173 |
| 2008/0180654 A1* | 7/2008 | Bathiche et al. | 356/51 |
| 2008/0204430 A1* | 8/2008 | Cheon et al. | 345/184 |
| 2008/0259289 A1* | 10/2008 | Nozaki et al. | 353/70 |
| 2008/0273017 A1* | 11/2008 | Woolley et al. | 345/173 |
| 2008/0273018 A1* | 11/2008 | Woolley et al. | 345/173 |
| 2009/0015555 A1* | 1/2009 | Takashima et al. | 345/158 |
| 2009/0058820 A1* | 3/2009 | Hinckley | 345/173 |
| 2009/0140958 A1* | 6/2009 | Otaki | 345/76 |
| 2009/0189789 A1* | 7/2009 | Oh | 341/20 |
| 2009/0212285 A1* | 8/2009 | Nishi et al. | 257/53 |
| 2010/0020043 A1* | 1/2010 | Park et al. | 345/174 |
| 2010/0044121 A1* | 2/2010 | Simon et al. | 178/18.03 |
| 2010/0103136 A1* | 4/2010 | Ono et al. | 345/173 |
| 2010/0107150 A1* | 4/2010 | Kamada et al. | 717/170 |
| 2010/0123675 A1* | 5/2010 | Ippel | 345/173 |
| 2010/0137027 A1* | 6/2010 | Kim | 455/556.1 |
| 2010/0164877 A1* | 7/2010 | Yu et al. | 345/173 |
| 2010/0164886 A1* | 7/2010 | Nakamura | 345/173 |
| 2010/0238138 A1* | 9/2010 | Goertz et al. | 345/175 |
| 2010/0277439 A1* | 11/2010 | Charlier et al. | 345/176 |
| 2010/0315371 A1* | 12/2010 | Katsu et al. | 345/173 |
| 2011/0035708 A1* | 2/2011 | Damale | 715/863 |
| 2011/0045813 A1* | 2/2011 | Choi | 455/418 |
| 2011/0057889 A1* | 3/2011 | Sakatsume | 345/173 |
| 2011/0061445 A1* | 3/2011 | Roehr et al. | 73/29.02 |
| 2011/0134110 A1* | 6/2011 | Song et al. | 345/419 |
| 2011/0141014 A1* | 6/2011 | Liao et al. | 345/158 |
| 2011/0157055 A1* | 6/2011 | Tilley et al. | 345/173 |
| 2012/0017180 A1* | 1/2012 | Flik et al. | 715/838 |
| 2012/0058755 A1* | 3/2012 | Olincy et al. | 455/417 |

* cited by examiner

PORTABLE TERMINAL WITH OPTICAL TOUCH PAD AND METHOD FOR CONTROLLING DATA IN THE SAME

CLAIM OF PRIORITY

This application claims the priority under 35 U.S.C. §119(a) of an application entitled "Portable Terminal With Optical Touch Pad And Method For Controlling Data In The Same" filed in the Korean Intellectual Property Office on Dec. 16, 2010 and assigned Serial No. 10-2010-0128991, the contents of which are hereby incorporated by reference.

BACKGROUND OF THE INVENTION

1. Field of the Invention

The present invention relates to a portable terminal having an input device comprised of an optical touch pad, and a method for controlling data in the portable terminal using the optical touch pad.

2. Description of the Related Art

In general, a portable terminal provides various functions from a communication function, such as voice and data communication, to a multimedia function, such as storage of various information items to enjoy games/moving pictures. Such portable terminals include a digital diary, a palm PC (personal computer), a portable game machine, a moving picture/music reproducer, a cellular phone, and a notebook PC.

Recently, other new functions such as a security function enabling banking business, a multimedia function, and a simple business function have become popular.

With a conventional mobile communication terminal, it was sufficient to conduct voice and data communication with only a keypad having numeric input keys, call/end keys, menu selection keys, movement keys, etc. However, as the multimedia function as well as the communication function has become advance in a portable terminal, a need to enlarge a display device in such a portable terminal has grown. However, the enlargement of a display device in a portable terminal pose a problem in the miniaturization effort. To this end, some portable terminals are not provided with a separate keypad by implementing a touch screen.

Portable terminals, which are provided with a touch screen as a display device, are generally bar-type terminals, wherein input, menu search or the like can be conducted mainly by operating the touch screen. One or more physical keys may be arranged at a side of the touch display device to navigate the main menu or to return to the previous screen.

However, a key arranged at the side of a display device is a drawback in miniaturizing the size of the portable terminal.

SUMMARY OF THE INVENTION

Accordingly, the present invention has been made to solve the above-mentioned problems occurring in the prior art, and an aspect of the present invention provides a portable terminal with an optical touch pad, which can contribute to the miniaturization of a portable terminal.

Another aspect of the present invention provides a portable terminal having an optical touch pad for enabling an input action to be executed on the rear side of the portable terminal.

Another aspect of the present invention provides a portable terminal having an optical touch pad capable of diversifying an input device.

In accordance with an aspect of the present invention, a portable terminal includes a display device installed on a front side of a housing, and an optical touch pad installed at least on the rear side of the housing, wherein the display device is formed by a touch screen.

In accordance with another aspect of the present invention, a method of controlling data in a portable terminal with an optical touch pad on the rear side of a housing includes: determining whether the touch pad is operated in a current mode of the portable terminal, and executing a function for controlling the data of the current mode in accordance with the operation of the touch pad.

According to the teachings of present invention, since a display device is arranged on the front side of the housing of the portable terminal, and an optical touch pad is arranged on the rear side of the housing, it is not required to provide a physical key at a side of the display device. As a result, the omission of side keys contributes to the enlargement of a display device or miniaturization of a portable terminal. Moreover, a user can operate the touch screen with the thumb and operate the touch pad on the rear side of the housing with the index finger or another finger in a state in which the user grasps the portable terminal, thus providing alternate convenient way of manipulating and navigating the content of a portable terminal by holding up the terminal using only one hand so that the user faces the display screen.

Furthermore, if an optical touch pad is provided in a state in which the optical touch pad is rectilinearly movable to a certain extent while maintaining its function, it will be possible to implement a function of a physical key by adding a separate switch member.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
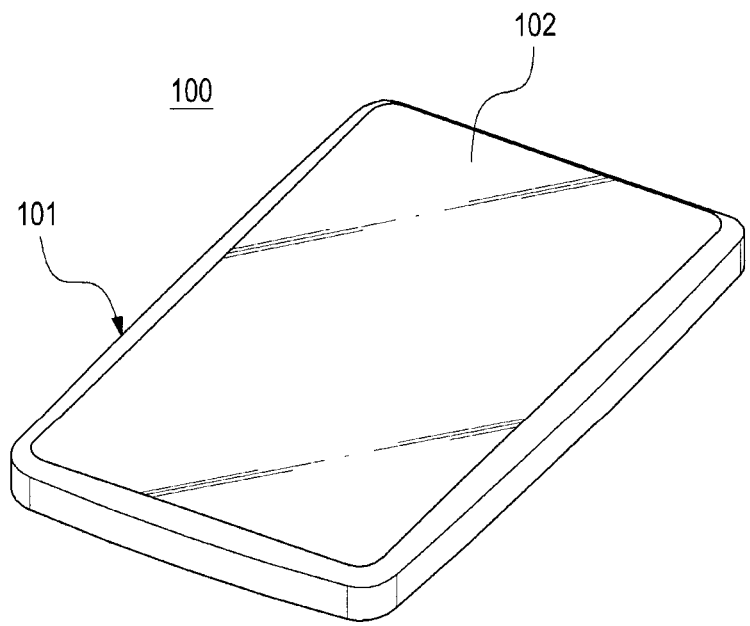
FIG. 1 is a perspective view showing a portable terminal in accordance with an embodiment of the present invention.

Hereinafter, embodiments of the present invention will be described with reference to the accompanying drawings. In the following description, the same elements will be designated by the same reference numerals although they are shown in different drawings. For the purposes of clarity and simplicity, a detailed description of known functions and configurations incorporated herein will be omitted as it may make the subject matter of the present invention unclear.

Figure 2:
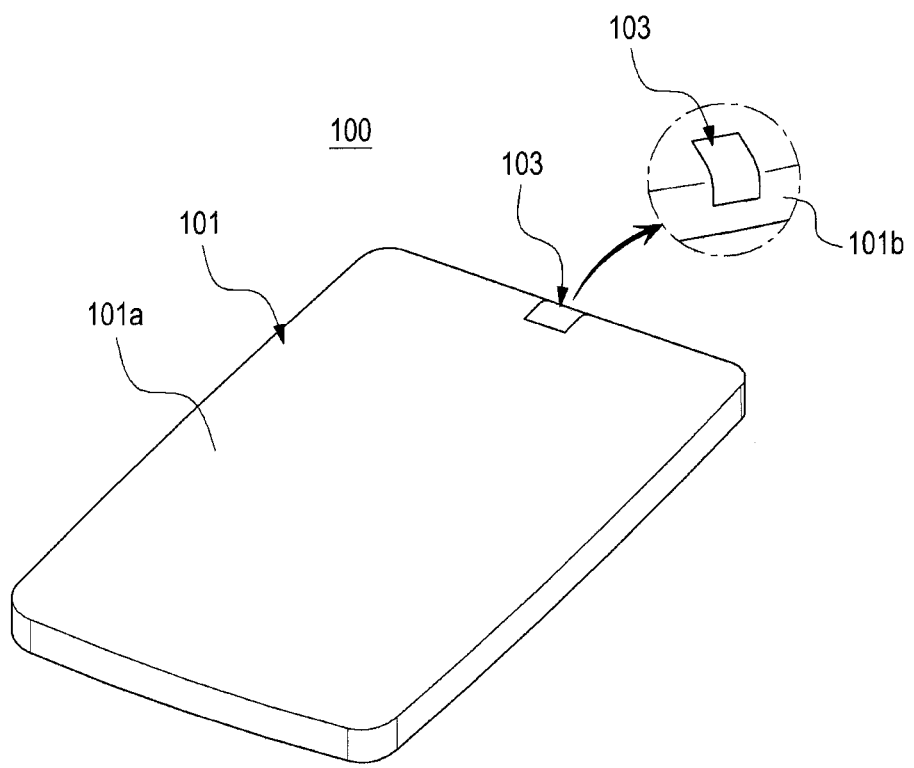
FIG. 2 is a perspective view showing the rear side of the portable terminal shown in FIG. 1.
Figure 3:
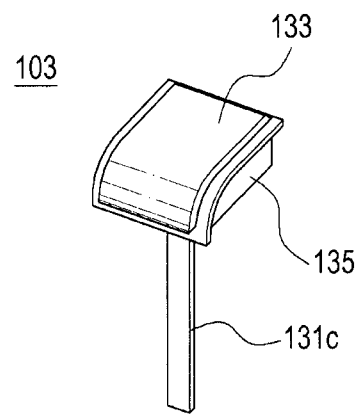
FIG. 3 is a perspective view showing an optical touch pad of the portable terminal shown in FIG. 2.
Figure 4:
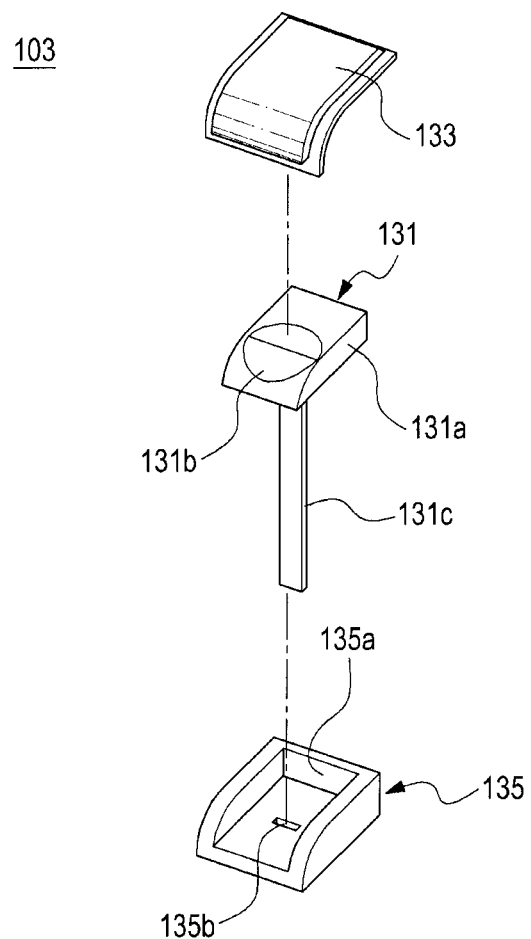
FIG. 4 is an exploded perspective view of the optical touch pad shown in FIG. 3.

Referring to FIGS. 1 and 2, a portable terminal 100 in accordance with an embodiment of the present invention includes a display device 102 provided on the front side of a housing 101, and an optical touch pad 103 provided on the rear side 101a of the housing 101 as an input device. The display device 102 is configured by a touch screen, so that the entirety of the front side of the housing 101 may be used as a space for mounting the display device 102.

The optical touch pad 103 may be installed to be rectilinearly movable on the housing 101, and may be used as a physical key.

In operation, when a user grasps the housing 101 of the terminal 100, the user's fingers operating the touch pad will be generally positioned on the upper rear side 101a of the housing 101. Therefore, it is desired to arrange the touch pad 103 over the rear side 101a and the top side 101b. However, it should be noted that the touch pad 103 may be arranged at other location of the rear side 101a of the housing 101 in accordance with the teachings of the present invention.

Now, the configuration of the touch pad 103 will be described in more detail with reference to FIGS. 3 to 6.

The touch pad 103 includes a front case 133, a sensor module 131, and a rear case 135. The front case 133 has a periphery, which is adapted to be arranged as a part of the outer area of the housing 101. That is, the housing 101 is formed with an opening (not shown) over the rear side 101a and the top side 101b, and the front case 133 is provided to close the opening, thereby completing the outer surface area of the housing 101.

The sensor module 131 is provided with an optical sensor 131b at the outer part of its body 131a. When configuring the sensor module 131, it is not necessary to provide a separate body. However, in order to stably connect a power source and a signal transmission line to the optical sensor 131b, the body 131a is arranged on the optical sensor 131. The present embodiment illustrates a configuration in which a flexible printed circuit board 131c is used as the signal transmission line. The flexible printed circuit board 131c is wired to extend from the optical sensor 131b and through the body 131a.

The rear case 135 is adapted to receive the sensor module 131, more specifically the optical sensor 131b and to stably anchor the sensor module 131 to the front case 133, wherein the rear case 135 is engaged with the inner periphery of the front case 133. The rear case 135 is formed with a reception recess 135a for receiving the sensor module 131, and a slit 135b extending through the rear case 135 to the outside of the rear case 135 is formed in the reception recess 135a. If the sensor module 131 is received in the reception recess 135a, the flexible printed circuit board 131c is wired to the outside of the rear case 135 through the slit 135b.

If the rear case 135 is joined to the front case 133 in a state in which the sensor module 131 is received in the rear case 135, the touch pad 103 is completed as a module type. The optical sensor 131b is opposed to the inner periphery of the front case 133. When installing the touch pad 103 to the housing 101, the optical sensor 131b is obliquely positioned in relation to the rear side 101a of the housing 101, more preferably to be oriented toward the corner between the rear side 101a and the top side 101b. That is, the sensing direction of the optical sensor 131b is obliquely arranged in relation to the rear side 101a of the housing 101. Through this arrangement, the optical sensor 131b can sense more precisely the user's operation of the touch pad 103, more specifically on the front case 133.

Figure 6:
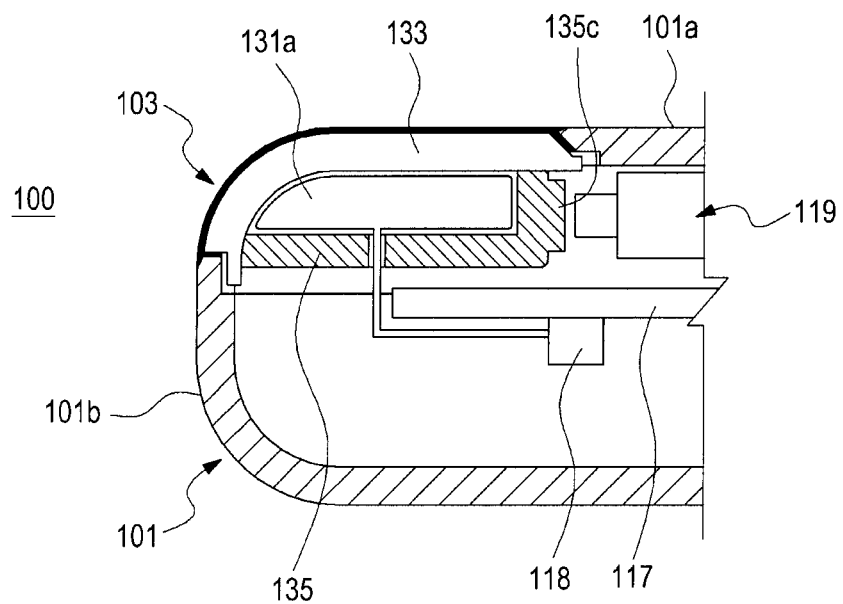
FIG. 6 shows the optical touch pad shown in FIG. 3 in a state in which the optical touch pad is installed in a terminal.

As shown in FIG. 6, the touch pad 103, more specifically the front case 133 is arranged as a part of the outer area of the housing 101, and the sensor module 131 received in the rear case 135, which is positioned within the interior of the housing 101.

A main board 117 is arranged in the interior of the housing 101, and the main board 117 is equipped with a connector 118 for connecting the optical sensor 131b, more specifically the flexible printed circuit board 131c. The flexible printed circuit board 131c is bent at a proper position within the interior of the housing 101, and an end of the flexible printed circuit board is connected to the connector 118.

As a result, the touch pad 103 is installed on the housing 101 to be capable of providing a screen scroll function or the like. In addition, depending on the operation mode of the terminal 100, the touch pad 103 may be used for adjusting volume or controlling screen brightness. A detail description of different touch pad functions during a plurality of operation modes will be explained later in details with reference to FIG. 8.

Figure 5:
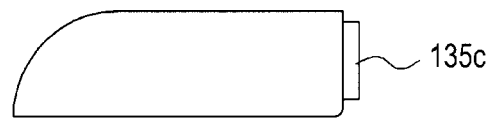
FIG. 5 is a side view of a rear case of the optical touch pad shown in FIG. 3.

Upon being installed to be rectilinearly movable on the housing 101 as described above, the touch pad 103 can be used as a physical type key. In order to use the touch pad 103 as a physical key, an actuation protrusion 135c protruding laterally is formed on the rear case 135, and a switch member 119 is provided in the housing 101 as shown in FIGS. 5 and 6.

A tact switch fixed on the main board 117 is exemplified as the switch member 119, and the actuation protrusion 135c is positioned facing to the switch member 119. The touch pad 103 is rectilinearly movable on the housing 101 of the terminal 100 in the longitudinal direction of the housing 101, so that, as the touch pad 103 is rectilinearly moved, the actuation protrusion 135c actuates the switch member 119.

In arranging such a physical key, it is not necessary to arrange a tact switch as the switch member 119. For example, it is possible to arrange the touch pad 103, more specifically the front case 133 only on the rear side of the housing 101, and arrange a dome switch between the rear case 135 and the main board 117 as the switch member. In such an embodiment, the main board 117, the dome switch and the touch pad 103 will form a stack configuration, and the touch pad 103 may be arranged to be rectilinearly movable in the direction of the thickness of the housing 101 (in FIG. 6, in the vertical direction). In the configuration shown in FIG. 6, it is possible to arrange a dome switch at an area where the rear case 135 and the main board 117 are opposed to each other, so that the dome switch can be used as a physical key.

Figure 7:
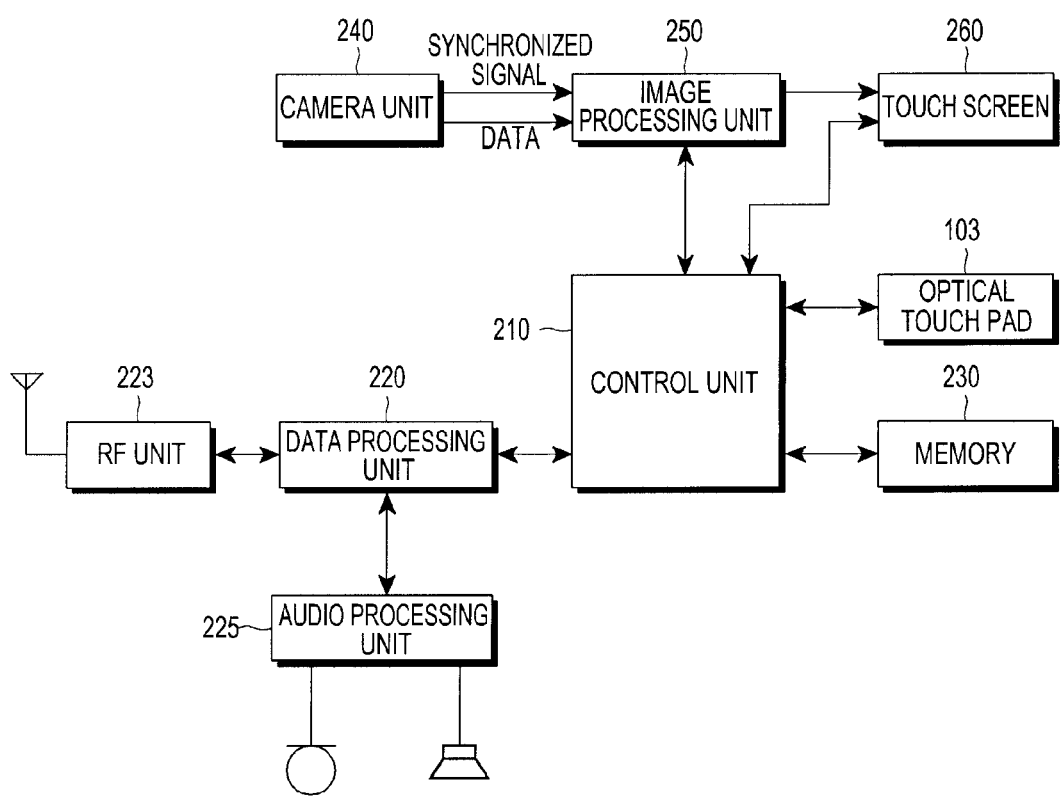
FIG. 7 shows a configuration of a portable terminal in accordance with an embodiment of the present invention.

FIG. 7 shows a configuration of a portable terminal in accordance with an embodiment of the present invention.

Referring to FIG. 7, an RF unit 223 conducts a wireless communication function of the portable terminal. The RF unit 223 includes a RF transmitter for up-converting frequency of transmitted signals and amplifying the transmitted signals, and an RF receiver for low noise-amplifying received signals and down-converting the frequency of the received signals. A data processing unit 220 includes a transmitter for coding and modulating the transmitted signals, and a receiver for demodulating and decoding the received signals. That is, the data processing unit 220 may consist of a MODEM and a CODEC. Here, the CODEC includes a data CODEC for processing packet data and an audio CODEC for processing audio signals. An audio processing unit 225 serves to reproduce received audio signals that are outputted from the audio CODEC of the data processing unit 220, or to transmit the transmitted audio signals, which are produced from a microphone, to the audio CODEC of the data processing unit 220.

A memory 230 may consist of program memories and data memories. The program memories may store programs for controlling the ordinary operations of the portable terminal, and programs for controlling data of the current mode in accordance with the operation of the optical touch pad provided in the portable terminal.

A control unit 210 serves to control the overall operations of the portable terminal.

In accordance with the present embodiment, the control unit 210 controls data displayed or executed in the current mode of the portable terminal in accordance with the operation of the touch pad.

In accordance with the present embodiment, if the current mode is the standby mode, the control unit 210 performs control in such a manner that a background screen change function is executed in accordance with the operation of the touch pad 103, wherein the operation of the touch pad 103 may be a touch movement in a corresponding direction among four directions of up, down, left and right.

In the standby mode, the background screen and icons may be displayed all together, wherein since the background layer and the icon layer are separated from each other, it is possible to change the background screen to another background screen in accordance with the operation of the touch pad 103.

In accordance with the present embodiment, if the current mode is a video communication mode, the control unit 210 may perform control in such a manner that the volume or brightness adjusting function is executed in accordance with the operation of the touch pad 103, wherein the operation of the touch pad 103 may be a touch movement in a corresponding direction among four directions of up, down, left and right.

In accordance with the present embodiment, if the current mode is an internet mode, the control unit 210 may perform control in such a manner that the mouse function is executed in accordance with the operation of the touch pad 103, wherein the operation of the touch pad 103 may be a touch movement in a corresponding direction among four directions of up, down, left and right.

In accordance with the present embodiment, if the current mode is a specific mode, the control unit 210 may perform control in such a manner that a data scroll function or a specific function is executed in accordance with the operation of the touch pad 103.

In such a case, the operation of the touch pad 103 for the data scroll may be a touch movement in a corresponding direction among four directions of up, down, left and right, and the operation of the touch pad 103 for executing the specific function may be a single touch.

In addition, the specific function may be a home key function, a back key function or an enter key function.

In addition, the control unit 110 may control the data of the current mode in accordance with the operation of the touch pad 130 regardless of the position of the portable terminal, i.e. regardless of the transversal mode or longitudinal mode.

As shown in FIG. 2, the optical touch pad 103 is arranged over the rear side and the top side of the housing of the portable terminal. The touch pad 103 may be operated by a touch movement in a corresponding direction among four directions of up, down, left and right, and a single touch, wherein the data displayed in the current mode of the portable terminal can be controlled in accordance with the operation of the touch pad 103.

A camera unit 240 photographs image data, and includes a camera sensor for converting photographed optical signals into electric signals, and a signal processing unit for converting the analog image signals photographed by the camera sensor into digital data. Here, it is assumed that the camera sensor is a CCD or CMOS sensor, and the signal processing unit may be implemented by a DSP (Digital Signal Processor). In addition, the camera sensor and the signal processing unit may be implemented in a one-piece type, or implemented separately.

An image processing unit 250 performs ISP (Image Signal Processing) for displaying image signals outputted from the camera unit 240 on a touch screen 260, wherein the ISP executes various functions, such as gamma correction, interpolation, spatial change, image effect, image scale, AWB, AE and AF. Therefore, the image processing unit 250 processes image signals outputted from the camera unit 240 in a frame unit, and outputs the frame image data to be suitable for the feature and size of the touch screen 160. In addition, the image processing unit 250 includes an image CODEC, and serves to compress the frame image data displayed on the touch screen 260 in a preset method, or to recover the compressed frame image data to the original frame image data. The image CODEC may be JPEG CODEC, MPEG4 CODEC, or Wavelet CODEC. Assuming that the image processing unit 250 has an OSD (On Screen Display) function, the image processing unit 250 may output on screen data in accordance with a displayed screen size under the control of the control unit 210.

The touch screen 260 may be operated as input and output units, wherein when it is operated as the display unit, the touch screen 260 displays image signals outputted from the image processing unit 250 as a screen, and displays user data outputted from the control unit 210. In addition, when being operated as the input unit, the touch screen 260 may display keys for inputting numeric and character information items, and function keys for setting various functions.

In accordance with the present embodiment, the touch screen 260 may display data controlled through the operation of the touch pad in the current mode.

The operations for controlling data in the above-mentioned portable terminal using an optical touch pad will be described in detail with reference to FIGS. 8 and 9.

Figure 8:
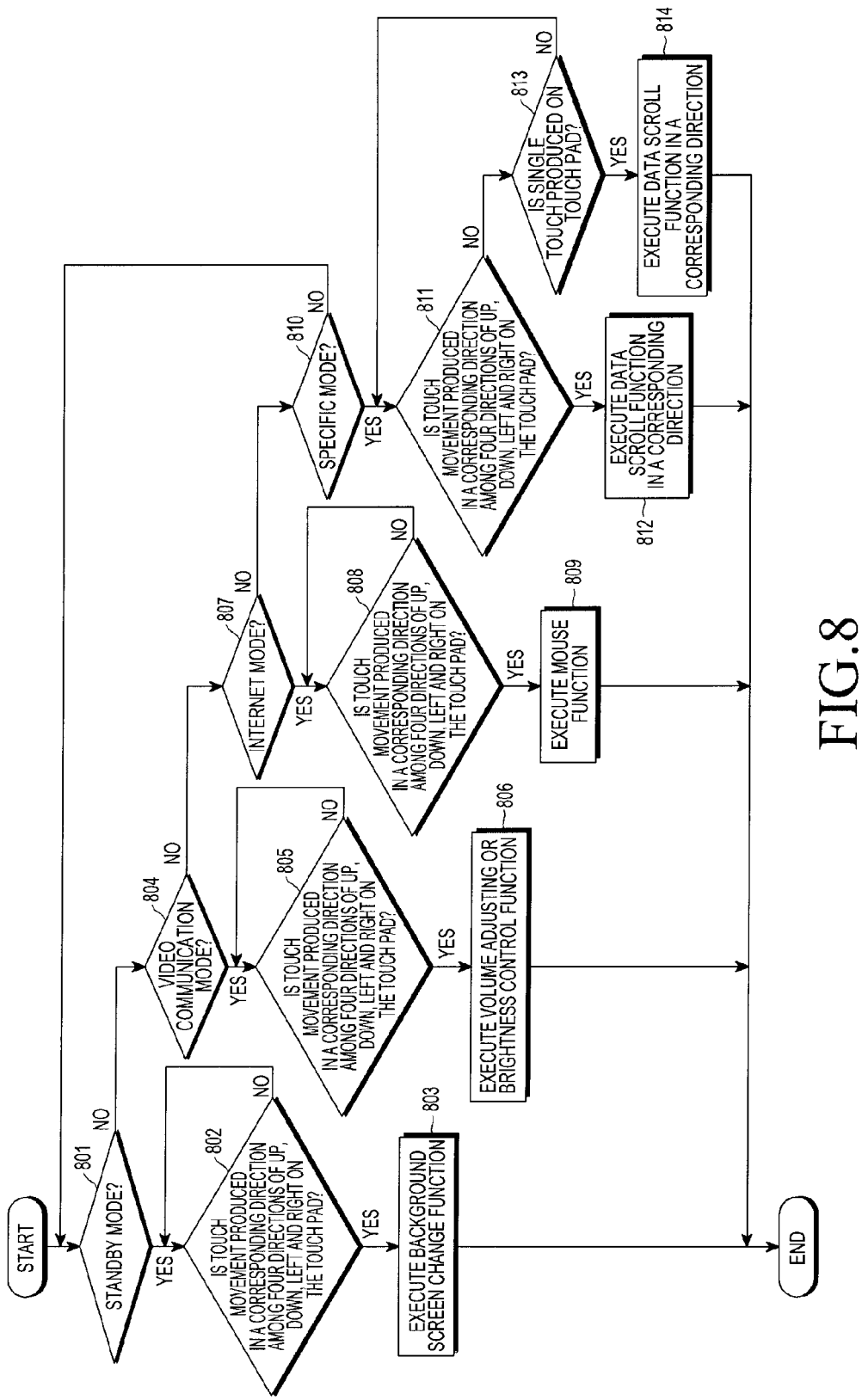
FIG. 8 is a flowchart showing a process for controlling data in the portable terminal shown in FIG. 7 using an optical touch pad.

FIG. 8 is a flowchart showing a process of controlling data using an optical touch pad in a portable terminal in accordance with an embodiment of the present invention, and FIGS. 9a to 9d are views for describing the process shown in FIG. 8.

Referring to FIGS. 7 and 8, if the current mode of the portable terminal is the standby mode, the control unit 201 senses this in step 801 and determines the operation of the touch pad 103. In the standby mode, if the touch movement is produced on the touch pad in a corresponding direction among four directions of up, down, left and right, the control unit 201 senses this in step 802, and proceeds with step 803, in which a function to change the background screen displayed on the touch screen 260 to another background screen is executed.

In step 803, the control unit performs control in such a manner that each time a touch movement in a corresponding direction among four directions of up, down, left and right is produced on the touch pad 103, the images stored in the memory 230 are sequentially displayed.

Figure 9A:
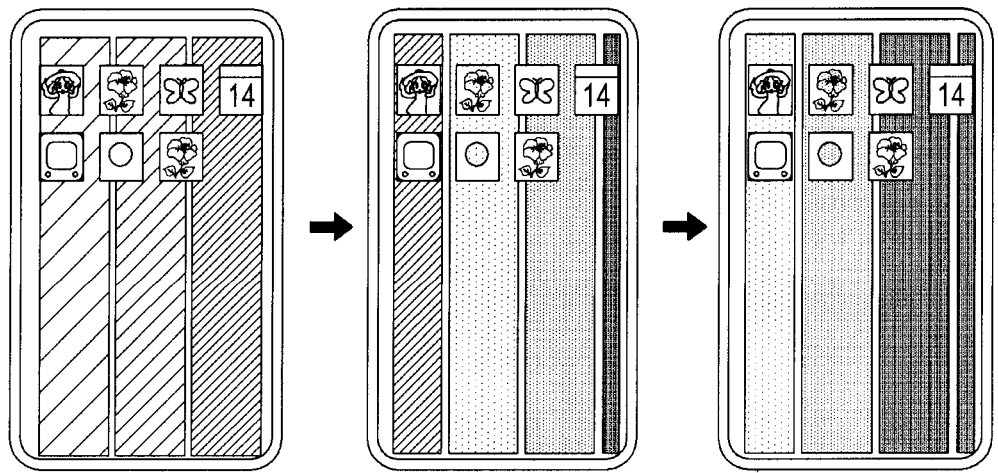
FIGS. 9a to 9d are views for describing the process shown in FIG. 8.

FIG. 9a shows that the background screen of the touch screen is changed each time a touch movement in a corresponding direction among four directions of up, down, left and right is produced on the touch screen during the standby mode.

In the standby mode, icons may be displayed together with the background screen, wherein since the background layer and the icon layer are separated from each other, it is possible to change the background screen to another background screen in accordance with the operation of the touch pad 103.

If the current mode is the video communication mode, the control unit 210 senses this in step 804, and determines the operation of the touch pad 103. If a touch movement in a corresponding direction among the four directions of up, down, left and right is produced on the touch pad 103 in the video communication mode, the control unit 210 senses this in step 805, and proceeds with step 806, in which the volume adjusting function or the screen brightness control function is executed.

In step 806, if a touch movement in the up or down direction is produced on the touch pad in accordance with setting, the control unit 210 may execute volume-up or volume-down, and if a touch movement in the left or right direction is produced on the touch pad, the control unit 210 may control the screen brightness in accordance with set values so that the screen is displayed lightly or darkly. Alternatively, if a touch movement in the left or right direction is produced on the touch pad in accordance with setting, the control unit 210 may execute volume-up or volume-down, and if a touch movement in the up or down direction is produced on the touch pad, the control unit 210 may control the screen brightness in accordance with set values so that the screen is displayed lightly or darkly.

Figure 9B:
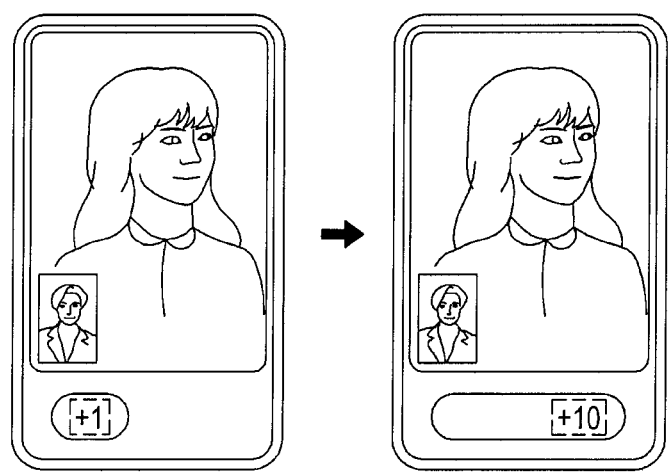

FIG. 9b shows that up/down adjusting of volume is executed each time a touch movement in a corresponding direction among the four directions of up, down, left and right is produced on the touch pad 103 during the video communication mode.

Figure 9C:
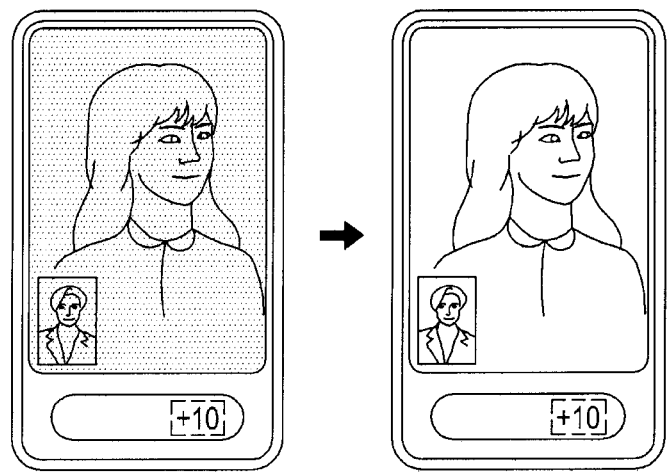

In addition, FIG. 9c shows that the screen brightness is controlled each time a touch movement in a corresponding direction among the four directions of up, down, left and right is produced on the touch pad 103 during the video communication mode.

If the current mode is the internet mode, the control unit 210 senses this in step 807, and determines the operation of the touch pad 103. If a touch movement in a corresponding direction among the four directions of up, down, left and right is produced on the touch pad 103 during the internet mode, the control unit senses this in step 807, and proceeds with step 809 in which a mouse function is executed.

In step 809, the control unit 110 may perform control in such a manner that an activated banner function is moved or the cursor displayed on the screen is moved to a corresponding position through a touch movement in a corresponding direction among the four directions of up, down, left and right on the touch pad 103.

If the current mode is a specific mode, the control unit 210 senses this in step 810, and determines the operation of the touch pad 103. If a touch movement in a corresponding direction among the four directions of up, down, left and right is produced on the touch pad 103 when the specific mode displays data, the control unit senses this in step 811, and proceeds with step 812, in which the scroll function for the data in the corresponding direction of the touch movement is executed.

Figure 9D:
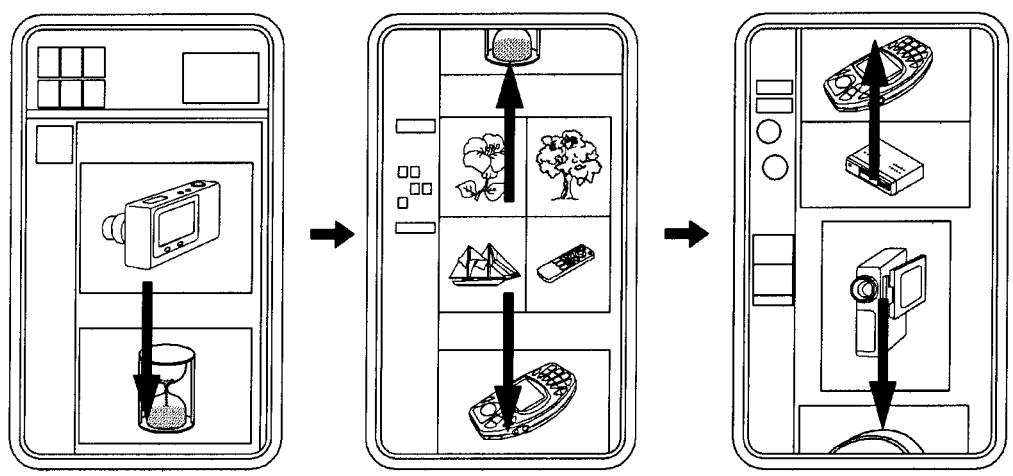

FIG. 9d shows that image data is scrolled upward or downward when a touch movement in the up or down direction is produced on the touch pad 103 while the image data is being displayed in the specific mode.

If a single touch is produced on the touch pad 103 in the specific mode, the control unit 210 senses this in step 813, and performs a specific set function.

The specific function may be a home key function, a back key function or an enter key function.

Although it is described by way of an example in the present embodiment that the set specific function is executed when a single touch is produced on the touch pad 103 in the specific mode, the specific mode may include the standby mode, the video communication mode, and the interne mode.

In addition, the operations as shown in FIG. 8 may control the data of the current mode in accordance with the operation of the touch pad 130, regardless of the position of the portable terminal, i.e. regardless of the transverse or longitudinal mode.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain embodiments thereof, it will be understood by those skilled in the art that various changes in form and details may be made therein without departing from the spirit and scope of the invention as defined by the appended claims.

What is claimed is:

1. A portable terminal comprising:
   a housing having a front wall, a rear wall, a sidewall bordering the front wall and the rear wall, and an opening formed at an edge of the housing in both the rear wall and the sidewall;
   a display device formed on the front wall;
   a touch pad disposed in the opening, the touch pad having an external surface, the external surface having a first portion that is flush with the rear wall and a second portion that is flush with the sidewall, wherein the first portion and the second portion are both depressible in a longitudinal direction relative to the housing; and
   a switch member installed within the housing and arranged to be activated when the touch pad is depressed in the longitudinal direction,
   wherein the first portion of the surface and the second portion of the surface are integrally formed.

2. The portable terminal as claimed in claim 1, wherein a particular touch input on the touch pad causes execution of a first type of function with respect to content on the display device in a first operation mode of the terminal, and causes execution of a second type of function with respect to displayed content in a second operation mode of the terminal.

3. The portable terminal as claimed in claim 2, wherein the touch pad is disposed and configured for manipulation by a user using only one hand while the terminal is held up so that the user faces the display device during the first operation mode and the second operation mode.

4. The portable terminal of claim 2, wherein:
the first operation mode is a standby mode displaying a plurality of icons, and the first type of function is a function of changing a background screen behind the plurality of icons in accordance with the touch input; and
the second operation mode is a communication mode, and the second type of function is one of a volume control function and screen brightness function.

5. The portable terminal of claim 4, wherein the particular touch input is a touch movement in a corresponding direction among up, down, left and right directions.

6. The portable terminal of claim 2, wherein:
the first operation mode is a standby mode displaying a plurality of icons, and the first type of function is a function of changing a background screen behind the plurality of icons; and
the second operation mode is an Internet mode, and the second type of function is a mouse function.

7. The portable terminal of claim 2, wherein the first operation mode is a communication mode, and the first type of function is a function of at least one of volume control and screen brightness control; and
the second operation mode is an Internet mode or a specific mode, and the second type of function is a scrolling function.

8. The portable terminal of claim 2, wherein the first or second operation mode is a communication mode, and in the communication mode, volume is controlled when the particular touch input is a first manner of touch input and screen brightness is controlled when the particular touch input is a second manner of touch input.

9. The portable terminal of claim 8, wherein the particular touch input is a touch movement in a corresponding direction among up, down, left and right directions, the first manner of touch input is touch movement in one of the left/right directions and the up/down directions and the second manner of touch input is touch movement in the other one of the left/right and up/down directions.

10. The portable terminal as claimed in claim 1, wherein the switch member is a tact switch, and the touch pad is rectilinearly moved in the longitudinal direction.

11. A portable terminal comprising:
a housing having a front wall, a rear wall, a sidewall bordering the front wall and the rear wall, and an opening formed at an edge of the housing in both the rear wall and the sidewall; a display device formed on the front wall; and
a touch pad disposed in the opening, the touch pad having an external surface, the external surface having a first portion that is flush with the rear wall and a second portion that is flush with the sidewall,
wherein the touch pad comprises: a front case having a periphery arranged as part of an outer exterior of the housing, a rear case arranged on an inner periphery of the front case, and an optical sensor received within the rear case, the optical sensor being arranged to face to the inner periphery of the front case.

12. The portable terminal as claimed in claim 11, further comprising a flexible printed circuit board extending from the optical sensor and through the rear case to an interior of the housing.

13. The portable terminal as claimed in claim 12, wherein a sensing direction of the optical sensor is obliquely arranged in relation to the rear wall of the housing.

14. The portable terminal as claimed in claim 11, further comprising a switch member installed within the housing, wherein the touch pad is installed to be rectilinearly movable relative to the housing so that the touch pad operates the switch member.

15. The portable terminal as claimed in claim 14, wherein the switch member is a tact switch, and the touch pad is rectilinearly moved in a longitudinal direction of the housing.

16. A portable terminal comprising:
a housing having a display device on a front side thereof;
a touch pad provided at a rear side of the housing, the touch pad being responsive to user input to cause content displayed on the display device to be varied according to a plurality of operation modes of the terminal; and
a switch member installed within the housing, wherein the touch pad is rectilinearly movable responsive to the user input so as to operate the switch member via contact with the touch pad;
wherein the touch pad comprises:
a front case having an outer surface forming part of an exterior surface of the housing, a rear case proximate the front case, and an optical sensor received within the rear case and facing an inner surface of the front case; and
an actuation protrusion formed on the rear case, wherein the actuation protrusion comes into contact with the switch member to actuate the switch member as the touch pad is rectilinearly moved.

* * * * *